April 3, 1934. A. P. BALL Re. 19,133
DOOR AND WINDOW CONSTRUCTION
Original Filed July 13, 1931
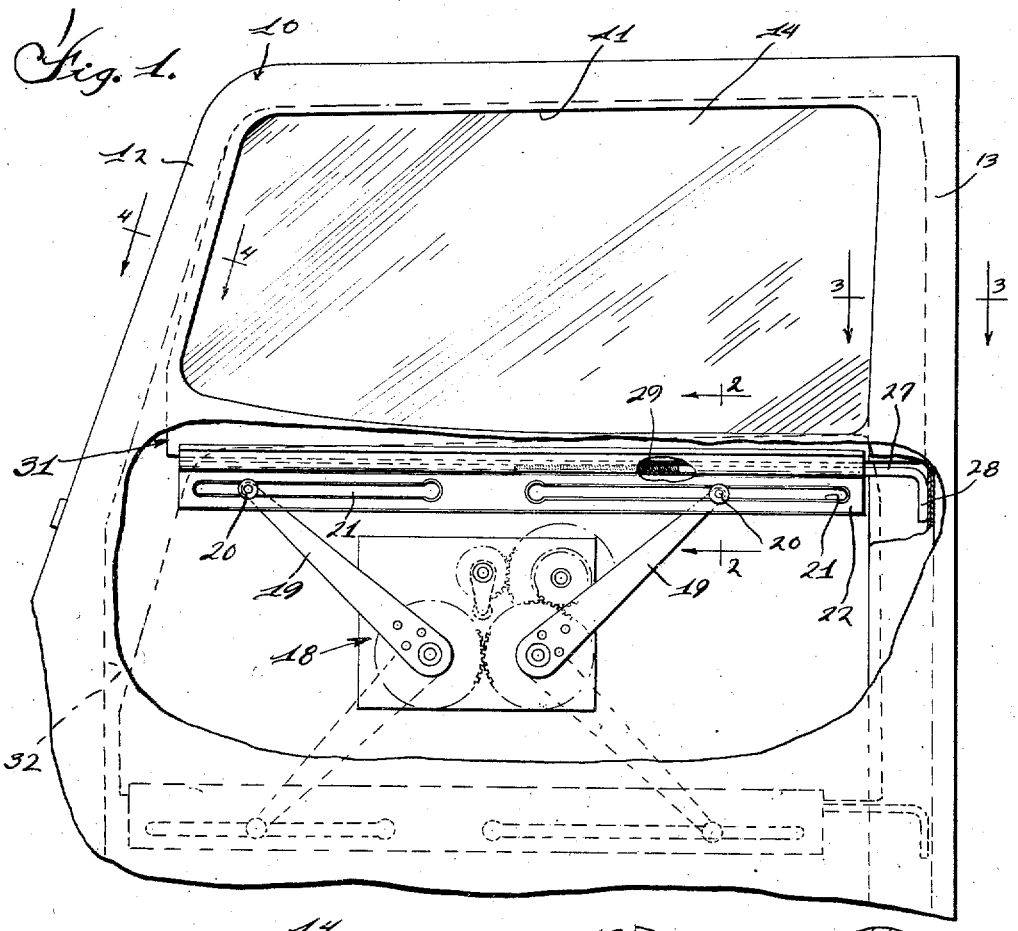
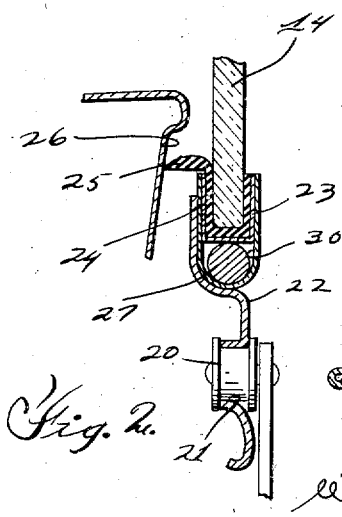
Fig. 2.
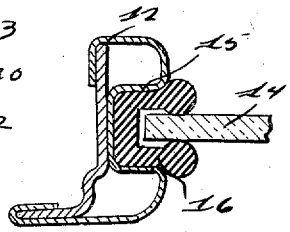
Fig. 4.
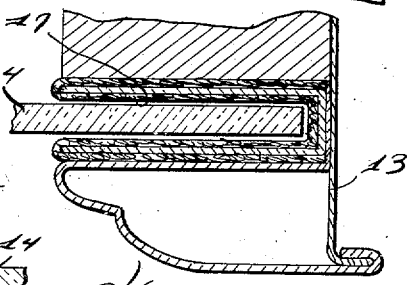
Fig. 3.
INVENTOR
Albert P. Ball
BY
Whittemore Hulbert & Whittemore & Belknap
ATTORNEYS Reissued Apr. 3, 1934 Re. 19,133

UNITED STATES PATENT OFFICE 19,133

DOOR AND WINDOW CONSTRUCTION

Albert P. Ball, Detroit, Mich., assignor to Briggs Manufacturing Company, Detroit, Mich., a corporation of Michigan Original No. 1,905,429, dated April 25, 1933, Serial No. 550,586, July 13, 1931. Application for reissue June 29, 1933, Serial No. 678,294

7 Claims. (Cl. 296—48)

This invention relates to vehicle bodies and more particularly to an improved door and window construction for motor vehicles and the like.

This invention relates more especially to a door and window structure wherein the vertical sides of the window opening are inclined with respect to one another, and wherein a glass panel or the like, having relatively vertically inclined side edge portions, is employed for closing this window opening.

Heretofore in constructions of this character, the inclined edge of the glass panel, when the latter was lowered, moved away from the vertical side of the window opening, with the result that difficulty was experienced in preventing rattling of the glass panel.

An object of this invention is to provide means in a structure of this character, wherein the glass panel may be lowered and raised without completely withdrawing the vertical edges of the glass panel from engagement with the channels or runways arranged at the sides of the window opening. As a further object the invention contemplates the provision of extensible and retractable means continuously engaging one of the glass runways to maintain the forward inclined edge of the glass panel in engagement with its inclined channel guide when the window is raised and lowered.

Another object of the invention is to provide a door structure wherein the door pillar at the front of the window opening is rearwardly inclined and has a correspondingly inclined glass runway, and wherein the rear door pillar is provided with a relatively deep preferably vertical glass runway, the construction being such that the glass panel may be shifted laterally with respect to said runways whereby the rear edge of the glass panel may be housed to a variable extent within the rear door pillar.

A further object of the invention is to provide a door for an automobile body wherein the rear vertical door pillar is substantially wider, in a direction longitudinally of the body, than the front door pillar and is provided with a substantially deeper glass runway channel, and wherein the rear edge of the window glass is free within said channel for forward and rearward slidable movement.

The several objects, advantages, and novel details of construction of this invention will be made more apparent as this description proceeds, especially when considered in connection with the accompanying drawing, wherein:—

Figure 1 is a sectional elevational view of a vehicle door constructed in accordance with this invention;

Figure 2 is an enlarged fragmentary sectional view taken substantially on the plane indicated by line 2—2 in Figure 1;

Figure 3 is an enlarged fragmentary sectional view taken substantially on the plane indicated by line 3—3 in Figure 1, and Figure 4 is an enlarged fragmentary detail sectional view taken substantially on the plane indicated by line 4—4 in Figure 1.

Referring now more particularly to the drawing, wherein like reference characters indicate like parts, it will be noted that there is illustrated a vehicle door 10, having a window opening 11 therein, the pillars or stiles 12 and 13 of the door being inclined with respect to one another. This produces a window opening 11, having non-parallel vertical sides and, as a consequence, the glass panel 14, which closes the window opening, is correspondingly shaped.

With an irregularly shaped glass panel 14, such as herein illustrated, the vertical edges of the glass panel, when the latter is lowered, tend to move away from one or both sides of the window opening, and it is in connection with this problem that the present invention pertains.

The pillar 12 of the door is preferably of substantially normal size in cross-section and, as illustrated in Figure 4, is shaped to provide a channel portion 15 in which a runway strip 16 is located, with which the edge of the glass panel 14 slidably engages.

The other pillar 13 of the door is relatively wide. That is, it is somewhat wider than customary, so as to provide a relatively deep channel portion 17, engageable by the edge of the glass panel 14.

If, as is customary, a door of this design is employed in a motor vehicle, it would constitute the front door if the vehicle is of a four-door type, and in such event the narrow pillar 12 of the door would be located forwardly and adjoin the edge of the windshield. Hence the relatively wider pillar 13 would not interfere with the clear forward and side vision of the driver of the vehicle.

The depth of the channel 17 is such that during the raising and lowering of the glass panel 14, the edge of the panel will not be completely withdrawn from the channel 17. This will be readily apparent by comparison of the full line position of the glass panel 14 with the dotted line position thereof, illustrated in Figure 1.

At 18 there is illustrated generally a window lifting mechanism which may be of any suitable or preferred construction. In the present embodiment of the invention herein illustrated, this mechanism is shown as comprising a pair of lifting arms 19, each provided with a roller 20, engageable in a slot 21 in a frame 22, mounted on the lower edge of the glass panel 14. Suitable gearing and an operating handle are provided for swinging the arms to raise and lower the window.

The frame member 22 includes a channel portion 23 in which a channel strip 24 is located, the channel portion 23 being firmly fixed to the lower edge of the glass panel 14. The channel strip 24 is preferably provided with a lateral lip or extension 25, adapted in the raised position of the panel 14 to engage the inclined face 26 of the sill portion of the door 10 to weatherproof the structure at this point.

Slidably mounted in frame 22 is an extensible or projectable member 27 in the form of a rod having a right-angularly extending end 28 adapted to engage in the base of the channel 17 and to slide therein as the panel 14 is raised and lowered. This extensible member 27 is normally urged outwardly into engagement with the channel 17 by means such as a coil spring 29, arranged in the hollow portion 30 of the frame member 22 in which the member 27 reciprocates. One end of this spring engages the adjacent end of the member 27 whereas the other end is anchored in any suitable manner (not shown).

With this structure, the extensible member 27 will engage the base of the channel 17 at all times during the raising and lowering of the glass panel, and will thus act to shift or move the glass panel laterally in edgewise direction toward the left, as viewed in Figure 1, to maintain the other inclined vertical edge of the glass panel in engagement with its channel 15, which, as illustrated, is inclined vertically.

In this connection, it will be noted from Figure 1 that the channel 15 in the pillar 12 of the door is arranged on an incline to a point well below the door opening 11 and from then on the channel 15 is parallel with the opposite channel 17. In order to utilize to advantage this channel formation, the lower left-hand edge of the glass panel 14 has a portion 31 of its edge parallel with its opposite edge, so that in the lower positions of the glass panel, further lateral edgewise movement of the panel forwardly is prevented when the parallel edge portion 31 of the glass panel engages the parallel portion 32 of the channel 15.

From the foregoing it will be seen that the rear edge of the glass 14, except in the particular position shown in Fig. 3, is at all times free from engagement with the base or bottom of the deep channel 17. Hence, the panel is mounted between channels which normally are spaced apart in depth to permit free horizontal edgewise movement of the glass. The spring device 28 functions to shift the glass forwardly toward the front pillar, while the cooperation of the forward inclined edge of the glass with the upper inclined portion of the front pillar channel results in shifting the glass rearwardly to penetrate the deep channel to varying depths.

The herein described form of construction has in practice been found to be commercially practical and satisfactory in every respect, but to those skilled in this art, it will be obvious that other modifications of the non-essential details of construction may suggest themselves, and to this end reservation is made to make such changes as may come within the purview of the accompanying claims.

I claim:

1. A vehicle body provided with a window opening comprising a frame having a vertical side and an inclined side, a glass channel carried by said inclined side and a relatively deep glass channel carried by said vertical side, a glass panel having corresponding vertical and inclined side edges slidably mounted in said channels, means projecting from the vertical edge of said panel and engageable in said deep channel for maintaining the inclined edge of said panel in engagement with said inclined channel during the raising and lowering of the panel, the lateral edgewise shifting movement of the panel resulting therefrom being less than the depth of the deep channel, for the purpose set forth.

2. In a vehicle body provided with a window opening and a frame having rear and front upright sides, a rearwardly inclined glass channel carried by said front side and a substantially deeper glass channel carried by said rear side, a glass panel having converging upright side edges slidably mounted in said channels, means for maintaining the forward edge of said panel in engagement with said inclined channel during raising and lowering of the panel and including a member mounted at the lower edge of the panel and movable therewith, means for raising and lowering the panel including devices slidably connected to the lower edge of the panel for supporting the panel at laterally spaced points against tilting movement within the deep channel, the lateral edgewise shifting movement of the panel into the deep channel being less than the depth of said channel.

3. In a vehicle body provided with a window opening and a frame having rear and front upright sides, a fixed rearwardly inclined glass channel carried by said front side and a fixed substantially deeper glass channel carried by said rear side, a glass panel having converging upright side edges slidably mounted in said channels, means for holding the forward edge of said panel within said inclined channel during raising and lowering of the panel and including a projecting member at the lower edge of said panel, means for raising and lowering the panel including devices slidably connected to the lower edge of the panel for supporting the panel at laterally spaced points against tilting movement within the deep channel, the glass panel being shiftable longitudinally in its plane into the deep channel substantially to the full depth thereof and the extent of said shiftable movement of the panel being less than the depth of the deep channel.

4. In a vehicle body provided with a window opening and a frame therein having rear and front upright sides, a fixed rearwardly inclined glass channel carried by said front side and a fixed substantially deeper glass channel carried by said rear side, a glass panel having converging upright side edges slidably mounted in said channels, regulator means for raising and lowering said panel, said panel being shiftable longitudinally in its plane into the deep channel substantially to the full depth thereof, and means for shifting said glass panel forwardly in its plane thereby to decrease the depth of penetration thereof in said deep channel and including a part movable with the panel.

5. In a vehicle body provided with a window opening and a frame therein having rear and front upright sides, a fixed glass channel carried by said front side and a fixed substantially deeper glass channel carried by said rear side, a glass panel having upright side edges slidably mounted in said channels, means including a swinging regulator arm for raising and lowering said panel, said panel being shiftable rearwardly in its plane to increase its depth of penetration in said deep channel, and means including a part movable with the panel for shifting said panel forwardly in its plane to decrease the depth of penetration of the panel in said deep channel.

6. In a vehicle body provided with a window opening and a frame therein having rear and front upright sides, a fixed glass channel carried by said front side and a fixed substantially deeper glass channel carried by said rear side, a glass panel having upright side edges slidably mounted in said channels, a longitudinal frame member secured to the lower edge of said panel, means including a swinging regulator arm cooperable with said member for raising and lowering the panel, said panel being shiftable rearwardly in its plane to increase its depth of penetration in said deep channel, and means including a part carried by said member and movable therewith for shifting said panel forwardly in its plane to decrease the depth of penetration of the panel in said deep channel.

7. In a vehicle body provided with a window opening and a frame therein having rear and front upright sides, a glass channel carried by said front side and a substantially deeper glass channel carried by said rear side, a glass panel having upright side edges slidingly mounted in said channels, regulator mechanism connected to said glass panel for raising and lowering the same, said panel being shiftable rearwardly in its plane to increase its depth of penetration in said deep channel, and means for shifting said panel forwardly in its plane to decrease the depth of penetration of the panel in said deep channel and including a part movable with the panel.

ALBERT P. BALL.